(12) United States Patent
Carrara et al.

(10) Patent No.: US 11,961,292 B2
(45) Date of Patent: Apr. 16, 2024

(54) COMPUTER-IMPLEMENTED METHOD FOR ASSISTING A USER IN INTERACTING WITH AN ELECTRONIC RELAY FOR ELECTRIC POWER DISTRIBUTION GRIDS

(71) Applicant: ABB S.p.A., Milan (IT)

(72) Inventors: Stefano Carrara, Cene (IT); Roberto Conca, Dalmine (IT); Davide Personeni, Treviolo (IT)

(73) Assignee: ABB S.p.A., Milan (IT)

( * ) Notice: Subject to any disclaimer, the term of this patent is extended or adjusted under 35 U.S.C. 154(b) by 191 days.

(21) Appl. No.: 17/580,915

(22) Filed: Jan. 21, 2022

(65) Prior Publication Data

US 2022/0230433 A1 Jul. 21, 2022

(30) Foreign Application Priority Data

Jan. 21, 2021 (EP) ..................................... 21152722

(51) Int. Cl.
*G06T 11/00* (2006.01)
*G06V 10/74* (2022.01)
(Continued)

(52) U.S. Cl.
CPC .............. *G06V 20/20* (2022.01); *G06T 11/00* (2013.01); *G06V 10/74* (2022.01); *G08B 5/36* (2013.01); *G09B 19/003* (2013.01); *H02J 3/00* (2013.01); *H04N 23/63* (2023.01); *H04N 23/635* (2023.01); *H04N 23/64* (2023.01)

(58) Field of Classification Search
None
See application file for complete search history.

(56) References Cited

U.S. PATENT DOCUMENTS 10,116,861 B1  10/2018  Graham et al.
2007/0236366 A1  10/2007  Gur et al.
(Continued)

FOREIGN PATENT DOCUMENTS

CN  103324943 A  9/2013
CN  105825204 A  8/2016
(Continued)

OTHER PUBLICATIONS

Dini et al., "Application of Augmented Reality Techniques in Through-life Engineering Services", Procedia Cirp, vol. 38, Jan. 1, 2015, pp. 14-23, XP055649710, NL, ISSN: 2212-8271, DOI: 10.1016/j.procir.2015.07.044.

(Continued)

*Primary Examiner* — Yi Wang
(74) *Attorney, Agent, or Firm* — Armstrong Teasdale LLP

(57) ABSTRACT

Disclosed herein is a computer-implemented method to assist a user in interacting with an electronic relay for electric power distribution grids. The method provides for identifying light signals emitted by one or more user-interface components of the user-interface panel of the electronic relay by processing images of said user-interface panel, which have been captured by the camera of a mobile computerized device. The method further provides for showing information, which describes the identified light signals emitted by said user-interface components on the display of said mobile computerized device.

11 Claims, 11 Drawing Sheets

(51) Int. Cl.
*G06V 20/20* (2022.01)
*G08B 5/36* (2006.01)
*G09B 19/00* (2006.01)
*H02J 3/00* (2006.01)
*H04N 23/60* (2023.01)
*H04N 23/63* (2023.01)

(56) References Cited

U.S. PATENT DOCUMENTS

| | | | |
|---|---|---|---|
| 2012/0259973 A1 | 10/2012 | Windell | |
| 2018/0287367 A1* | 10/2018 | Locatelli | H02H 3/006 |
| 2020/0250431 A1* | 8/2020 | Fei | G05B 19/418 |
| 2020/0302172 A1 | 9/2020 | Yoda | |

FOREIGN PATENT DOCUMENTS

| | | |
|---|---|---|
| CN | 105894015 A | 8/2016 |
| CN | 106355187 A | 1/2017 |
| EP | 3678048 A1 | 7/2020 |

OTHER PUBLICATIONS

Extended European Search Report issued in EP Application No. 21152722.1, dated Jul. 8, 2021, 9 pages.

* cited by examiner

COMPUTER-IMPLEMENTED METHOD FOR ASSISTING A USER IN INTERACTING WITH AN ELECTRONIC RELAY FOR ELECTRIC POWER DISTRIBUTION GRIDS

CROSS-REFERENCE TO RELATED APPLICATIONS

This application claims priority to European Patent Application No. EP21152722.1, filed Jan. 21, 2021 and titled "A COMPUTER-IMPLEMENTED METHOD FOR ASSISTING A USER IN INTERACTING WITH AN ELECTRONIC RELAY FOR ELECTRIC POWER DISTRIBUTION GRIDS", which is hereby incorporated by reference in its entirety.

BACKGROUND

The present disclosure relates to the field of electric power distribution grids operating at low or medium voltage levels.

More particularly, the present disclosure relates to a computer-implemented method to assist a user in interacting with an electronic relay for electric power distribution grids.

Electric power distribution grids include switching devices (e.g. circuit breakers, disconnectors, contactors) or electronic devices (e.g. HMIs, PLCs, controllers and the like) designed to enable specific grid sections to operate properly.

In many cases, these switching devices or electronic devices are operatively associated with or include electronic relays. These latter electronic devices are adapted to provide grid management functionalities (e.g. protection functionalities, synchro-reclosing functionalities, and the like) for grid sections.

Normally, an electronic relay has a user-interface panel including a number of user-interface components (e.g. DIP switches, LED devices, and the like) designed to allow a user to interact with said electronic relay, namely to provide input information or commands to the electronic relay and receive output information or visual signals from the electronic relay.

As is known, some user-interface components are designed for signalling purposes. To this aim, they can emit light signals indicative of operating conditions (e.g. an electric fault or a particular operating state) of the electronic relay and/or of the electric or electronic devices operatively associated to the electronic relay.

Generally, these signalling components are light sources (e.g. LED devices) arranged on the user-interface panel of the electronic relay and driven by the controller of the electronic relay. However, in some cases, such user-interface components may include a display arranged on the user-interface panel and adapted to show signs or icons emitting light signals.

In general, the light signals emitted by these user-interface components correspond to predefined signalling contents to be provided by the electronic relay. Therefore, a user can acquire information on the operating conditions of the electronic relay and/or the electric or electronic devices operatively associated thereto by simply observing the emitted light signals.

The experience has shown that this task may be rather difficult when the user-interface panel is provided with multiple signalling components, each of which may be configured to emit light signals of different types.

Therefore, unless being particularly experienced, a user has often to refer to technical manuals to distinguish the emitted light signals one from another and interpret correctly the information contents provided by said light signals.

Obviously, this inconvenient makes the interaction with the electronic relay (e.g. during a maintenance intervention) rather inefficient and time consuming.

In addition to the above, a user may encounter other difficulties in interacting with an electronic relay.

Electronic relays often have user-interface panels with relatively complex layouts. Thus, a user may find difficulties in identifying the type or functionalities of the various user-interface components, in distinguishing the user-interface components one from another or in finding the position of a certain user-interface component of interest on the user-interface panel.

Again, resorting to highly skilled personnel or to technical manuals is necessary to ensure a correct interaction with the electronic relay.

The above-mentioned problems are even made more critical by the circumstance that, often, electronic relays are installed in positions uncomfortable to reach or in operating sites with poor lighting conditions and poor connectivity to the Internet.

In view of the considerations above, it is evident that, in the state of the art, it is quite felt the need for innovative solutions of relatively easily technical implementation and capable of overcoming or mitigating the evidenced technical issues, thereby allowing a user (even if not specialized or particularly experienced) to interact with an electronic relay in an efficient and easy manner.

BRIEF DESCRIPTION

In order to respond to this need, the present disclosure provides a computer-implemented method to assist a user in interacting with an electronic relay for electric power distribution grids, according to the following claim 1 and the related dependent claims.

In a general definition, the method, according to the disclosure, includes the following steps:

activating a camera of a mobile computerized device;

showing images of a user-interface panel of said electronic relay on a display of said mobile computerized device. Said images are conveniently captured by said camera while the user frames said user-interface panel by means of said mobile computerized device;

processing said images to identify one or more user-interface components and other physical features of said user-interface panel. The identification of said user-interface components and physical features includes a comparison of said images with predefined models of user-interface panels;

based on the identification of the user-interface components and physical features of the user-interface panel, showing first augmented reality features on the display of the mobile computerized device. Said first augmented reality features are configured to assist a user in framing said user-interface panel by using the mobile computerized device. Said first augmented reality features are shown superimposed to said images on the display of the mobile computerized device;

based on the identification of the user-interface components and physical features of the user-interface panel, sampling portions of images of the user-interface panel of the electronic relay, which are captured by the camera of the mobile computerized device during an observation time interval, in which the user frames the user-interface panel of the electronic relay by means of said mobile computerized device;

processing the sampled portions of images of the user-interface panel to identify one or more possible light signals emitted by one or more user-interface components of said user-interface panel. The identification of the light signals emitted by said user-interface components includes a detection of sequences of light pulses emitted by said user-interface components and a comparison of the detected sequences of light pulses with predefined sequences of light pulses that can be emitted by said user-interface components;

based on the identification of the light signals emitted by said user-interface components, showing on the display of the mobile computerized device first information describing the identified light signals emitted by said user-interface components.

In some embodiments, the visual signals emitted by one or more user-interface components of the user-interface panel of the electronic relay are configured to signal an electric fault or an operating status of said electronic relay and/or of an electric or electronic device operatively associated to said electronic relay.

In some embodiments, the method of the disclosure includes:

based on the identification of the user-interface components and physical features of the user-interface panel, showing, on the display of the mobile computerized device, second augmented reality features to assist a user in identifying said user-interface components. Said second augmented reality features are superimposed to the images shown on the display of the mobile computerized device.

In some embodiments, the method of the disclosure includes:

showing, on the display of the mobile computerized device, third augmented reality features to assist a user in carrying out an operating procedure on said electronic relay. Said third augmented reality features are conveniently superimposed to a selected image of the user-interface panel of the electronic relay.

In some embodiments, the method of the disclosure includes:

showing, on the display of the mobile computerized device, in addition to said third augmented reality features, second information describing the operating steps of the operating procedure to be carried out on the electronic relay.

In some embodiments, the method of the disclosure includes:

providing a graphic user interface on the display of the mobile computerized device. Said graphic user interface includes graphic resources to show graphic patterns configured to allow a user to interact with said mobile computerized device.

In some further aspects, the present disclosure thus relates to a mobile computerized device, according to the following claim 10, and to a computer program, according to the following claim 11.

Further characteristics and advantages of the present disclosure will emerge more clearly from the description of preferred, but not exclusive embodiments, of which non-limiting examples are shown in the attached drawings.

DRAWINGS

DETAILED DESCRIPTION

With reference to the above-mentioned figures, the present disclosure refers to a computer-implemented method MTH for assisting a user in interacting with an electronic relay 100 for electric power distribution grids operating at low or medium voltage levels.

For the purposes of the present application, the term "low voltage" (LV) relates to operating voltages lower than 1 kV AC and 1.5 kV DC whereas the term "medium voltage" relates to operating voltages up to some tens of kV, e.g. up to 72 kV AC and 100 kV DC.

The method, according to the disclosure, concerns the interaction of a user with an electronic relay 100 adapted to be operatively associated to one or more electric devices (e.g. switching devices) or electronic devices (e.g. other electronic relays, HMIs, PLCs, controllers, and the like) of an electric grid.

Figure 1:
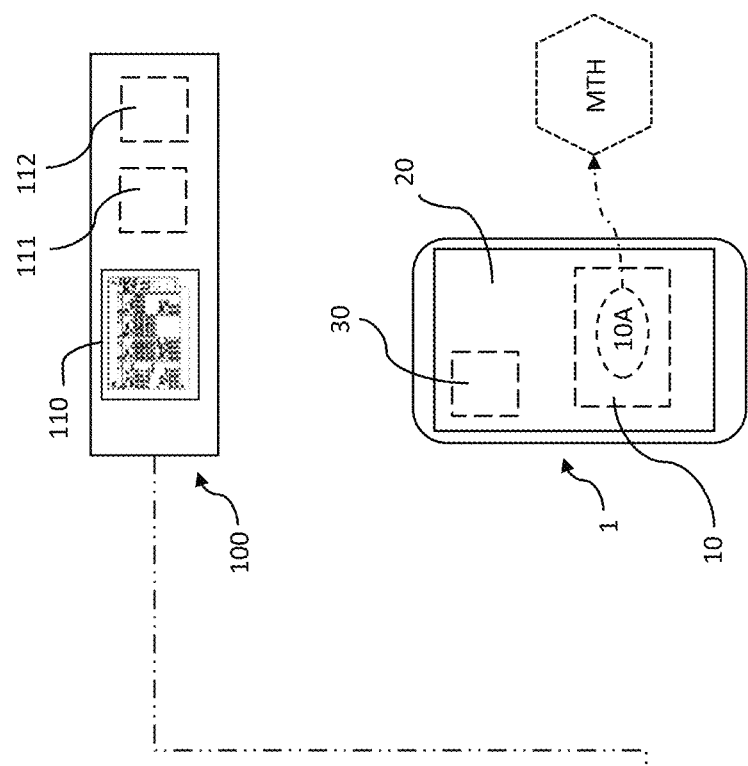
FIG. 1 is a schematic view of an example of an electric grid including a switching device, an electronic relay operatively associated to said switching device and a mobile computerized device configured to implement the method of the disclosure.
Figure 1:
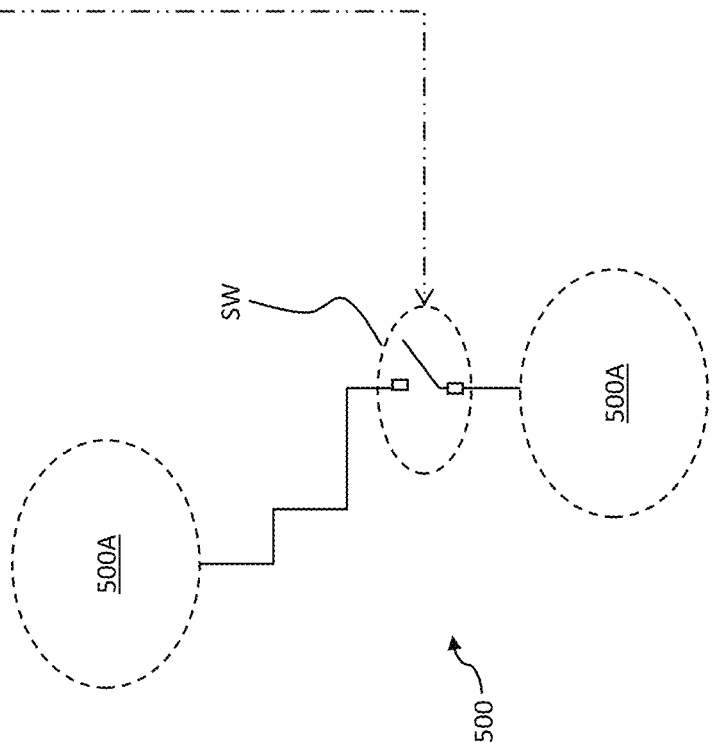

FIG. 1 schematically shows an example of electric grid 500, in which an electronic relay 100 is installed. In this case, the electronic relay 100 is operatively associated with a corresponding switching device SW (e.g. a circuit breaker, disconnector, contactor, or the like) capable of electrically connecting or disconnecting different grid sections 500A, 500B.

In general, the electronic relay 100 is adapted to control the operation of the electric or electronic devices, to which it is operatively associated (e.g. the switching device SW) in such a way to provide grid management functionalities (e.g. control functionalities, protection functionalities, synchro-reclosing functionalities and the like) for some portions of the electric grid.

As an example, referring again to FIG. 1, the electronic relay 100 may be adapted to enable the switching device SW to re-connect the grid sections 500A, 500B only upon carrying out synchro-reclosing tasks confirming that these electric circuits operate within their compatibility area.

Figure 2:
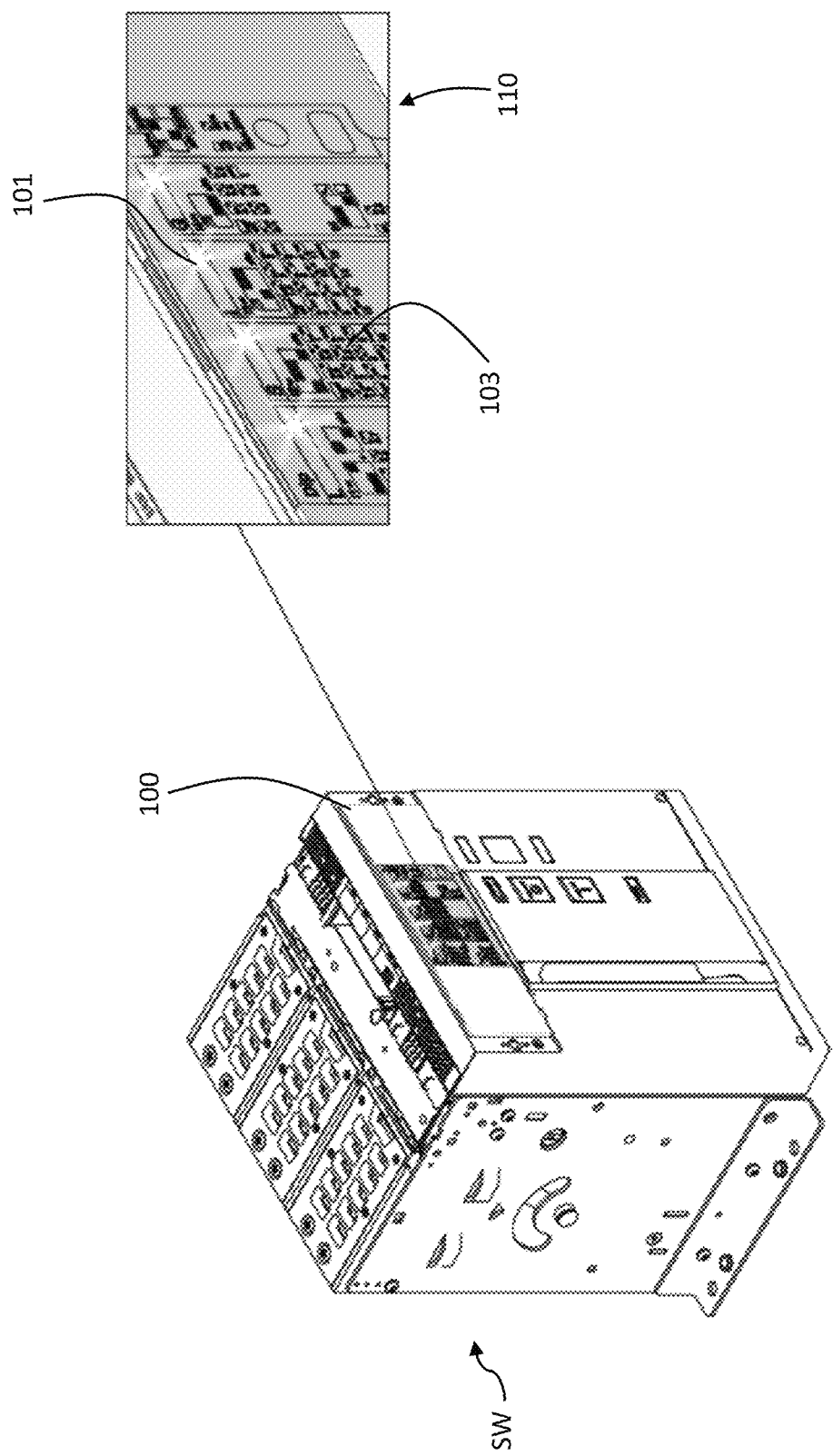
FIG. 2 is a schematic view of a switching device having an electronic relay installed on board a switching device.

The electronic relay 100 may be installed on board a switching device SW (FIG. 2).

As an alternative (not shown), the electronic relay 100 may be installed on board an electrical switchboard for electric power distribution grids.

As a further alternative (not shown), the electronic relay 100 may be a self-standing device installed on an electric power distribution grid.

The electronic relay 100 is provided with a user-interface panel 110 (normally a front panel) including one or more user-interface components 101, 102, 103, 104.

In general, the above-mentioned user-interface components are configured to allow a user to interact with the electronic relay 100 (more particularly with the internal control unit thereof), in particular to provide input information or commands to the electronic relay and receive output information or visual signals from the electronic relay.

The user interface components of the front panel 110 may include electromechanical switches or buttons, signalling devices, displays, and the like.

The user-interface panel 110 conveniently includes user-interface components 101, 102 providing signalling functionalities. These signalling components are, in fact, configured to emit light signals indicative of the operating conditions (e.g. an electric fault or an operating state) of the electronic relay and/or the operating conditions of the electric or electronic devices operatively associated to the electronic relay.

In some embodiments, the light signals emitted by these user-interface components 101, 102 are formed by light pulses having a predefined colour and blinking at a predefined frequency. As an example, a light signal may be formed by a sequence of light pulses having a red colour and a blinking frequency of 2 Hz.

In general, each light signal emitted by a signalling component 101, 102 is associated to a predefined signalling content to be provided by the electronic relay. For example, a light signal having a given colour and a given blinking frequency may be indicative of an electric fault, another light signal having a different colour and/or a different blinking frequency may be indicative of an operating status of a switching device, and so on).

FIG. 2 shows an example of electronic relay, in which the user-interface panel 110 includes a number of light sources 101 (e.g. LED devices) adapted to emit the above-mentioned light signals. In this case, the above-mentioned signalling components are formed by the above-mentioned light sources 101.

Figure 3:
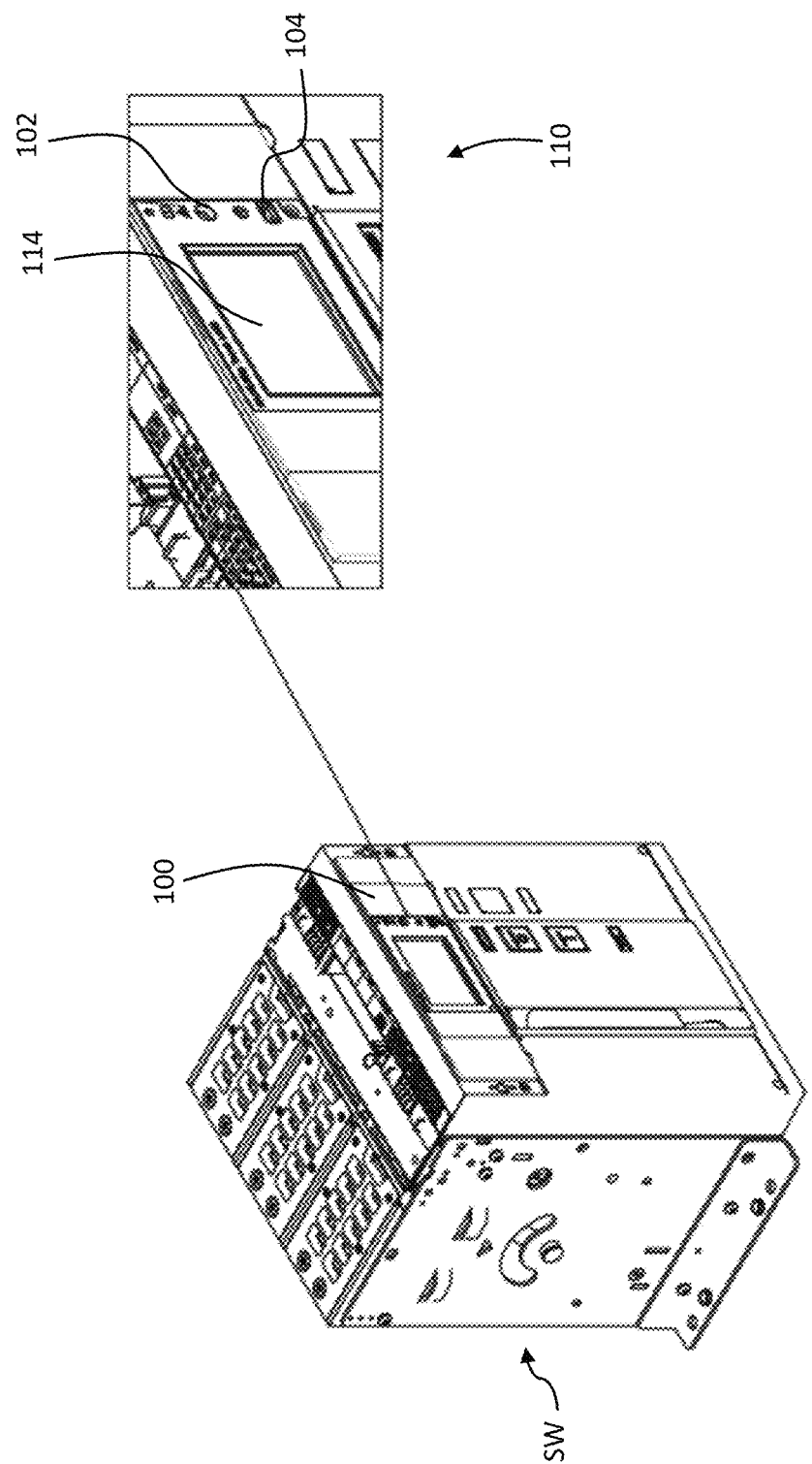
FIG. 3 is a schematic view of another example of a front panel of an electronic relay.

FIG. 3 shows another example of electronic relay, in which the user-interface panel 110 includes a display 114 configured to show signalling components 102 (e.g. graphic icons or signs shown on the display 114 and generated by means of a suitable graphic user-interface or hard lighting buttons) emitting the above-mentioned light signals.

The user-interface panel 110 conveniently includes also user-interface components 103, 104
providing set-up or control functionalities. These set-up or control components are configured to allow a user to provide input information or commands to the electronic relay.

FIG. 2 shows an example of electronic relay, in which the user-interface panel 110 includes a number of DIP switches and hard buttons 103 that can be manually operated by a user to provide set-up signals or command signals to the electronic relay. In this case, the DIP-switches and hard buttons 103 form the above-mentioned set-up or control components.

In the embodiment of FIG. 3, instead, the display 114 of the user-interface panel 110 may be configured to include control components 104 (e.g. graphic buttons shown on the display 114 and generated by means of a suitable graphic user-interface or hard control buttons) that can be touched by the user to provide command signals or information to the electronic relay.

In some embodiments, the electronic relay 100 includes input and output ports 111, at which it can exchange data signals or control signals with external electric or electronic devices (e.g. sensors, other relays, switching devices, controllers, and the like) operatively connected thereto (FIG. 1).

In some embodiments, the electronic relay 100 includes also a controller 112 provided with processing resources (e.g. including one or more microprocessors) capable of executing software instructions stored or storable in a storage medium (e.g. a memory of said control unit) to carry out the functionalities provided for the electronic relay.

Conveniently, the above-mentioned control unit is operatively coupled with the user-interface components of the user-interface panel 110 and with the above-mentioned input and output ports 111.

In some cases, the electronic relay 100 may include or be operatively coupled with a number of accessory devices (not shown) designed to potentiate/expand the functionalities of the internal controller 112.

The electronic relay 100 may include or be operatively coupled with various types of communication buses (not shown). As an example, the electronic relay 100 may be arranged to communicate with its accessory devices through local buses (e.g. implementing communication protocols of the Fieldbus type) and/or arranged to communicate with external devices through system or switchboard buses (e.g. implementing communication protocols of the Fieldbus, Modbus, Profibus, Profinet or Modbus-TCP type).

The electronic relay 100 may also have remote communication capabilities for communication with one or more remote computerized devices through the Internet or suitable LAN or WAN communication lines.

In general, the electronic relay 100 may be realized at industrial level according to solutions of known type. Therefore, in the following, it will be described only in relation to the aspects of interest of the disclosure, for the sake of brevity.

As mentioned above, the method MTH, according to the disclosure, is designed to assist a user in interacting with an electronic relay 100 for electric power distribution grids operating at low or medium voltage levels.

For the sake of clarity, it is reiterated that a user "interacts with an electronic relay" when the user can provide input information or commands to the electronic relay and can receive output information or signals (e.g. the above-mentioned light signals) from the electronic relay.

Figure 4:
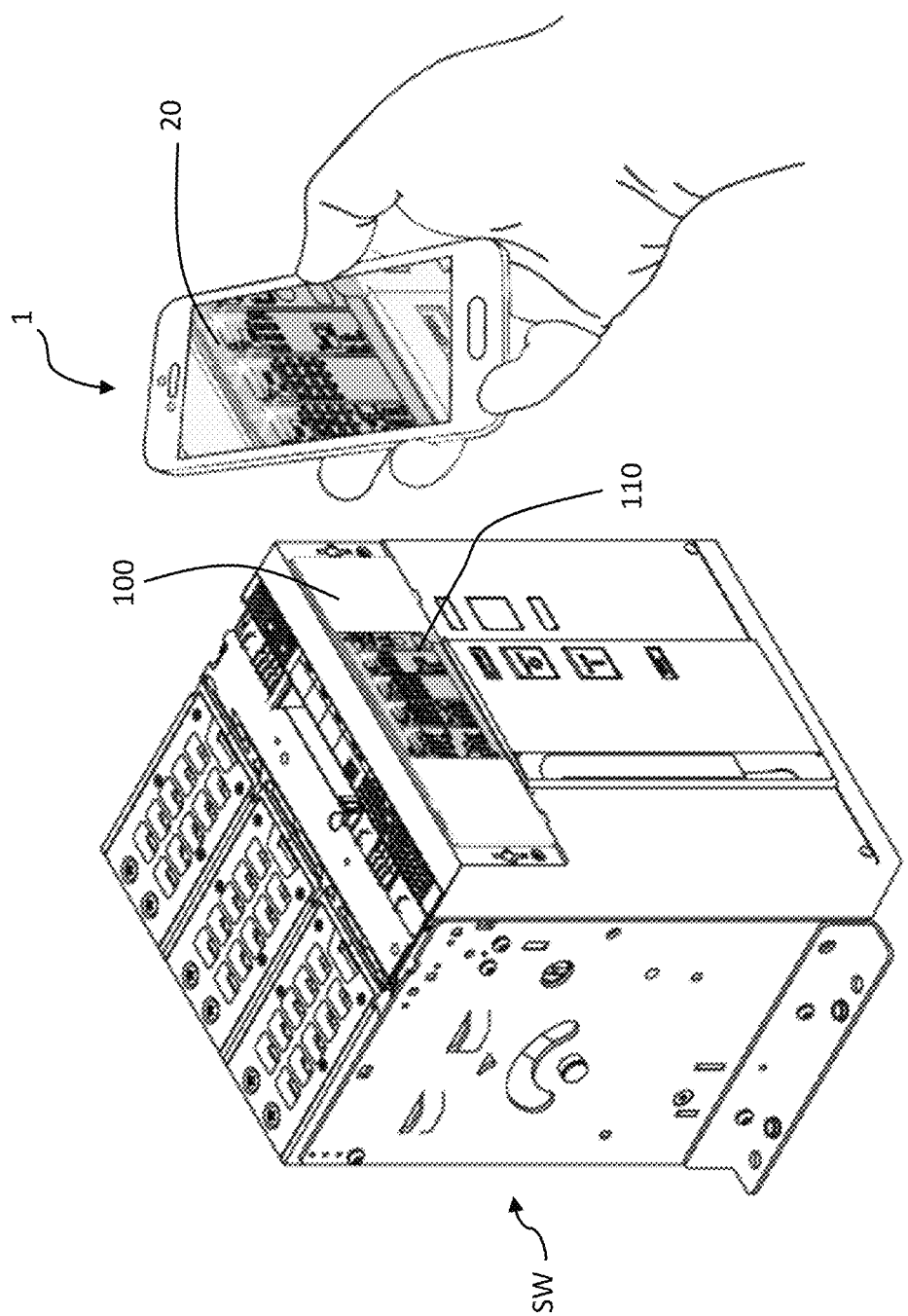
FIG. 4 is a schematic view of a mobile computerized device implementing the method of the disclosure.

The method MTH, according to the disclosure, is designed for being implemented by a mobile computerized device 1, through which the user has to frame the front panel 110 of the electronic relay 100 (FIG. 4).

In general, the mobile computerized device 1 may be of known type, such as a laptop computer, a tablet, a smartphone, or the like. As an example, it may be a commercially available smartphone equipped with an Android™ or iOS™ or Harmony™ operating system.

The mobile computerized device 1 includes a control unit 10 including digital data processing resources 10A (e.g. one or more microprocessors).

Conveniently, the digital data processing resources 10A of the control unit 10 are capable of executing suitable software instructions stored in a memory, which are configured to implement the method MTH, according to the disclosure, when executed by said digital data processing resources (FIG. 1).

In some embodiments, the above-mentioned software instructions are stored in a memory of the control unit 10 upon being downloaded (during a suitable installation phase or even in real time) into the mobile computerized device 1 from a suitable computerized platform, according to operating modes of known type.

In order to allow the implementation of the method MTH, according to the disclosure, the mobile computerized device 1 includes a display 20 and a camera 30 operatively associated to the control unit 10 and controlled by this latter in a known manner.

As mentioned above, in fact, during the execution of the method MTH, according to the disclosure, the user of the computerized device has to frame the front panel 110 of the electronic relay 110. Images of the electronic relay are acquired through the camera 30 and shown by the control unit 10 on the display 20 (FIG. 4). In order to capture the images of the electronic relay, data sampling techniques and/or signal processing techniques of known type may be used.

The steps of method MTH of the disclosure are now described in details referring to FIGS. 5-11, in which the display 20 of a mobile computerized device 1, during the execution of some steps of the method MTH, is schematically represented.

The steps of the method MTH of the disclosure will be here described with reference to the embodiment of FIG. 2 of the electronic relay 100 for the sake of simplicity. It is however intended that the method MTH of the disclosure can be carried out even if the front-panel 110 of the electronic relay 100 is arranged differently, for example in such a way to include a display 114 as shown in FIG. 3.

Conveniently, the method MTH of the disclosure may be executed by the mobile computerized device 1 upon activation of the user, for example by touching a suitable activation icon made available on the display 20, when the above-mentioned software instructions are downloaded into the mobile computerized device 1.

Figure 5:
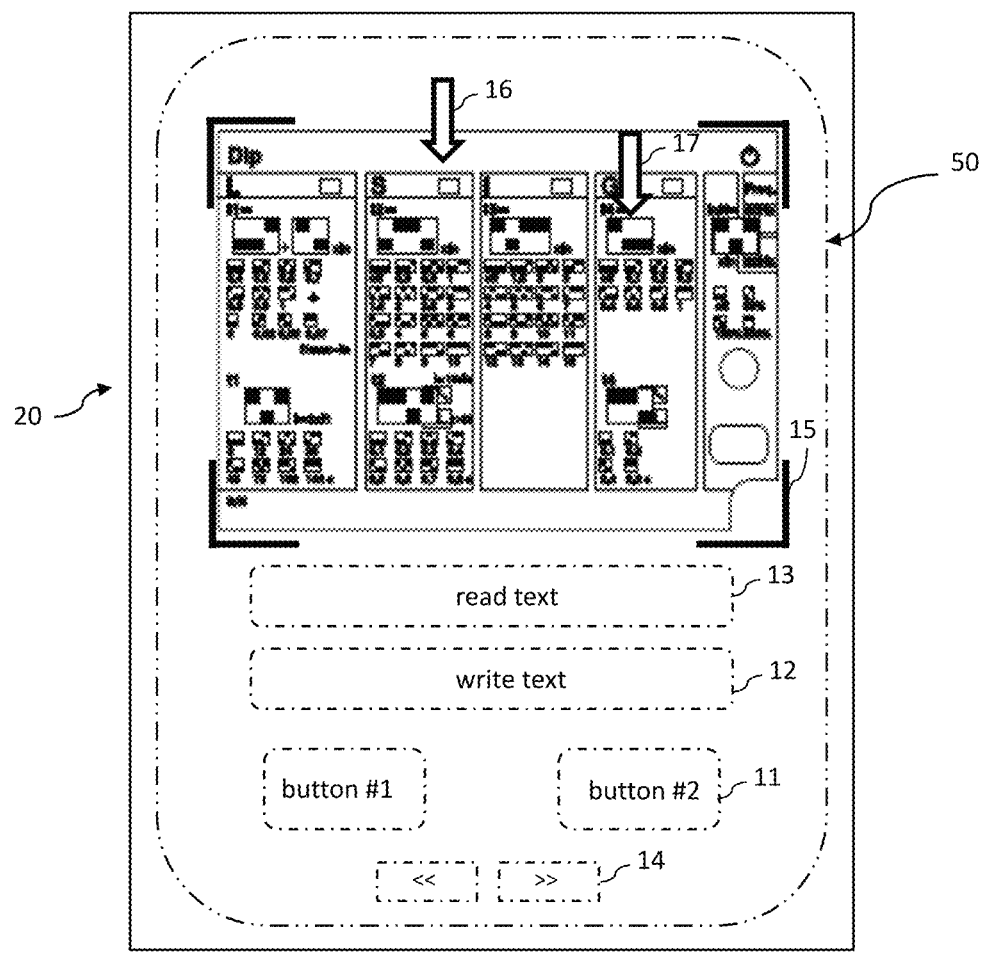
FIGS. 5-11 are schematic views showing some steps of the method, according to the disclosure, as implemented by the mobile computerized device of FIG. 4.

In some embodiments, the control unit 10 of the mobile computerized device provides a graphic user interface 50 on the display 20, during the execution of the method MTH of the disclosure (FIG. 5).

The graphic user interface (GUI) 50 is a graphic environment that makes available suitable graphic patterns (e.g. graphic icons, graphic windows, graphic cursors, visual indicators, visual menus, augmented reality features, and the like) configured to allow a user to interact with the mobile computerized device 1.

In particular, the GUI 50 makes available graphic patterns to allow a user to provide input information or commands to the control unit 10 and to allow a user to read output information provided by the control unit 10 and, possibly, to observe visual signals to be observed by the user on the display 20.

FIG. 5 shows the display 20 of the mobile computerized device during the execution of a generic step of the method MTH of the disclosure and it provides an overview of the functionalities provided by the GUI 50 of the mobile device.

As illustrated, in general, during the execution of the method MTH, the GUI 50 of the mobile computerized device is capable of making available graphic patterns 11 (e.g. graphic buttons) activatable by a user (e.g. by touching them on the display 20) to provide input commands to the control unit 10, graphic patters 12 (e.g. graphic windows, menus, masks and the like) to assist a user in providing input text information (e.g. by typing said information in the display 20) to the control unit 10 of the mobile computerized device, graphic patterns 13 (e.g. graphic windows, menus, masks and the like) to assist a user in reading output text information provided by the control unit 10, graphic patterns 14 (e.g. graphic buttons) activatable by a user (e.g. by touching them on the display 20) to navigate through different graphic pages or menus made available by the GUI 50 and augmented reality features 15, 16, 17 superimposed to an image IM framed by the camera 30 and shown on the display 30.

In general, the GUI 50 of the mobile computerized device may be designed according to computer graphics techniques of known type and the control unit 10 of the mobile computerized device may exploit data processing algorithms procedures or algorithms of known type to show the above-mentioned graphic patterns on the display 20 through the GUI 50.

According to the disclosure, the method MTH includes a step, in which the control unit 10 activates the camera 30 of the mobile computerized device 1.

Figure 6:
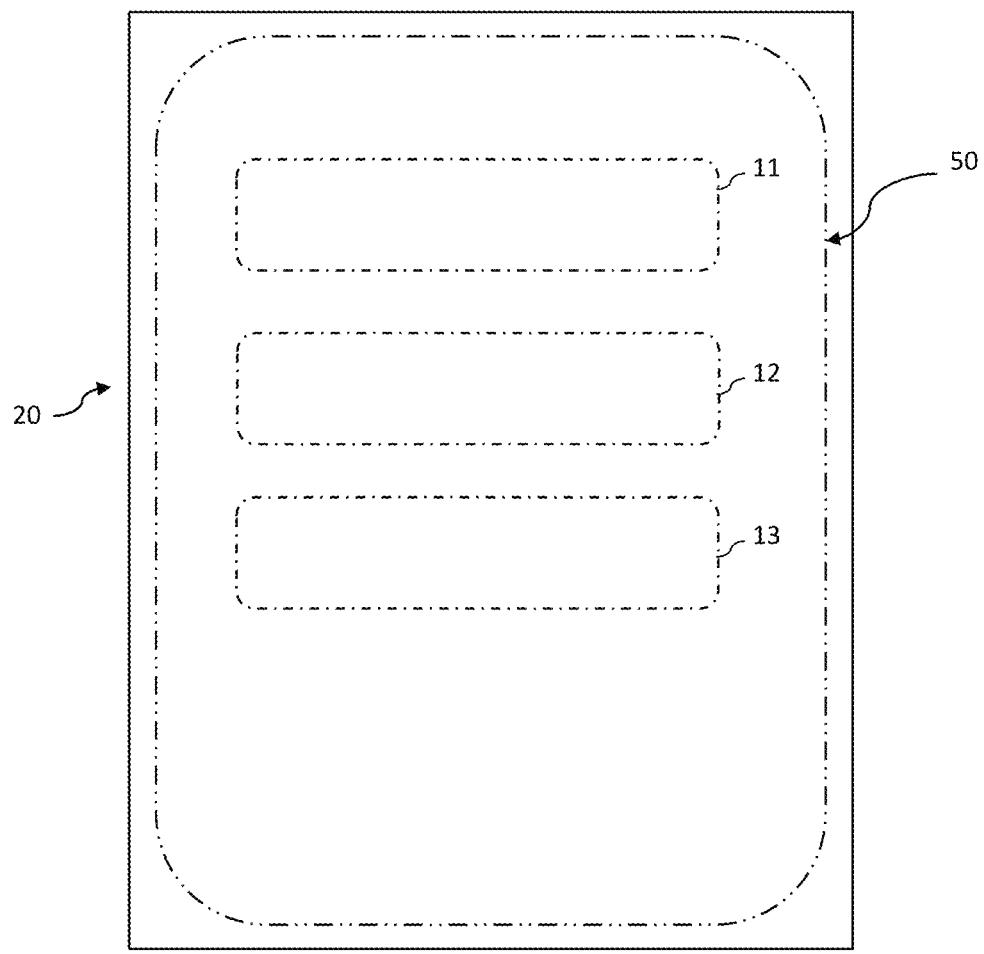

In some embodiments, the activation of the camera 30 is carried out by the control unit 10 upon receiving a suitable input command by the user. Conveniently, a user may provide such an input command by touching a suitable graphic button 11 on a graphic page made available by the GUI 50 as soon as the execution of the method MTH starts (FIG. 6).

Figure 7:
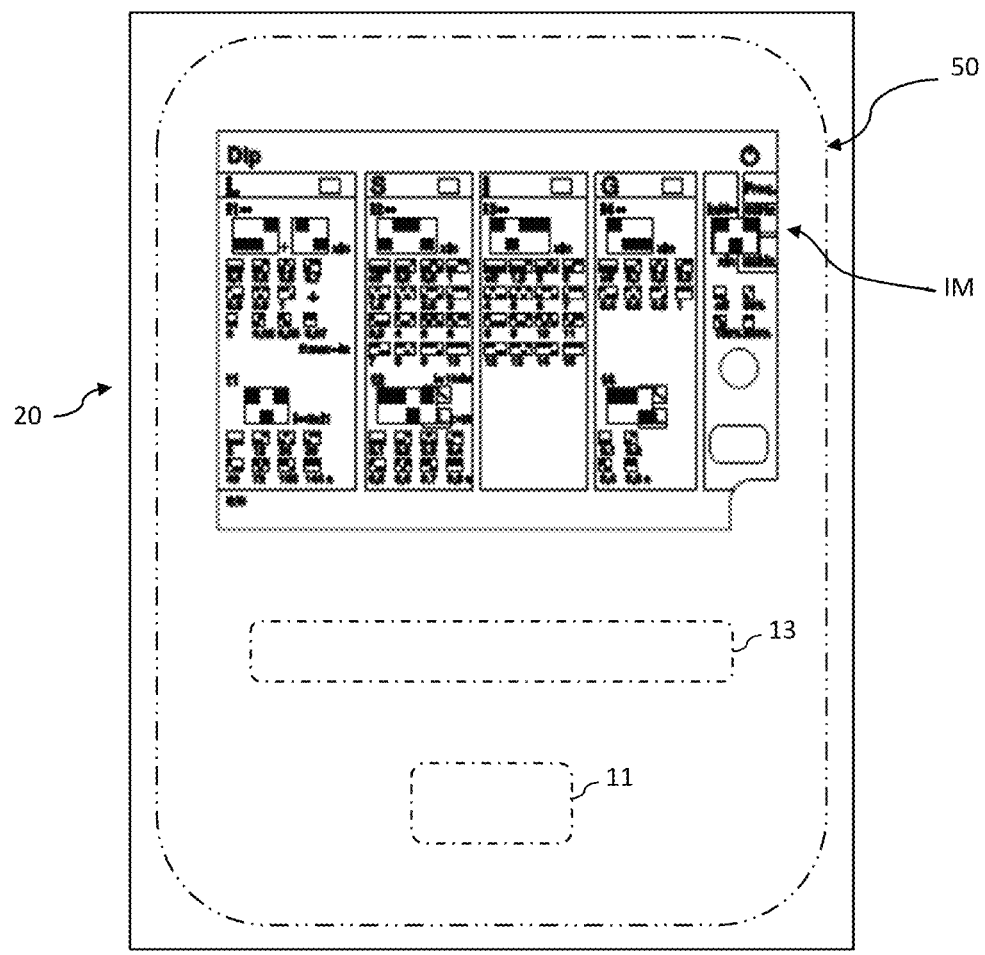

According to the disclosure, the method MTH includes a step, in which the control unit 10 shows in real time (e.g. with a negligible time delay) images IM of the user-interface panel 110 on the display 20 of the mobile computerized device (FIG. 7).

The images IM are the images captured by the camera 30 while the user frames the user-interface 110 panel by means of the mobile computerized device 1.

In order to show the images IM on the display 20, the control unit 10 may adopt data processing techniques of known type to process the images captured by the camera 30, e.g. exploiting data processing procedures or algorithms commonly adopted in computerized devices (e.g. smartphones) equipped with a camera and provided with image preview capabilities.

In some embodiments, the GUI 50 makes available suitable graphic patterns 11, 13 to allow a user to provide commands or read information while the images IM captured by the camera 30 are shown on the display 20.

According to the disclosure, the method MTH includes a step, in which the control unit 10 processes the images IM captured by the camera 30 to identify the user-interface components and other physical features (e.g. corners, holes, edges, and the like) arranged on the user-interface panel 110.

In order to carry out this identification step, the control unit 10 conveniently compares the images IM captured by the camera 30 with predefined models of user-interface panels of electronic relays of known type. To this aim, the control unit 10 may conveniently process the images IM captured by the camera 30 through data processing procedures or algorithms of known type, for example Viola-Jones object detection algorithm or Sliding Window algorithm, and the like.

In some embodiments, the control unit 10 carries out automatically the above-mentioned identification step while the images IM captured by the camera 30 are shown on the display 20, as illustrated above (FIG. 7).

Figure 8:
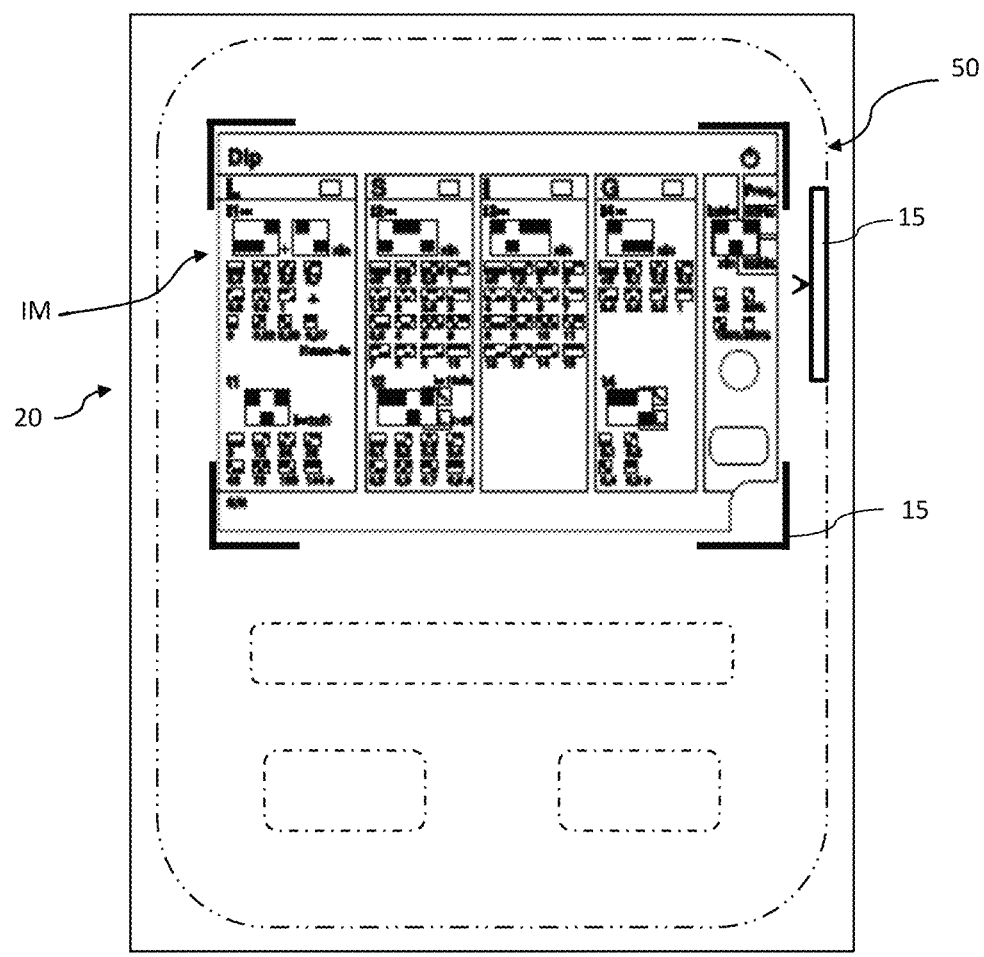

According to the disclosure, the method MTH includes a step, in which the control unit 10 shows first augmented reality (AR) features 15 on the display 20 of the mobile computerized device (FIG. 8).

The first AR features 15 are configured to assist a user in framing the user-interface panel 110 correctly by using the mobile computerized device (namely the camera 30 of this latter). For example, the first augmented features 15 are designed to assist the user in finding the correct position and distance to frame the user-interface panel 110.

Conveniently, the control unit 10 shows the first AR features 15 superimposed to the images IM captured by the camera 30 and shown on the display 20. In this way, a user can easily watch some visual references useful to maintain the mobile computerized device 1 at a right position and distance with respect to the electronic relay 1 in order to frame correctly the user-interface panel 110.

The control unit 10 generates the first AR features 15 based on the identification information collected at the above-mentioned identification step of the user-interface components and physical features of the user-interface panel 110.

The identified user-interface components and physical features of the user-interface panel 110 constitute, in fact, suitable character markers or positional tracers for generating the first AR features 15.

In order to generate the AR features 15, the control unit 10 may conveniently process the images captured by the camera 30 through suitable AR algorithms or procedures of known type, for example OpenGL's Scene Rendering Techniques, and the like.

Figure 9:
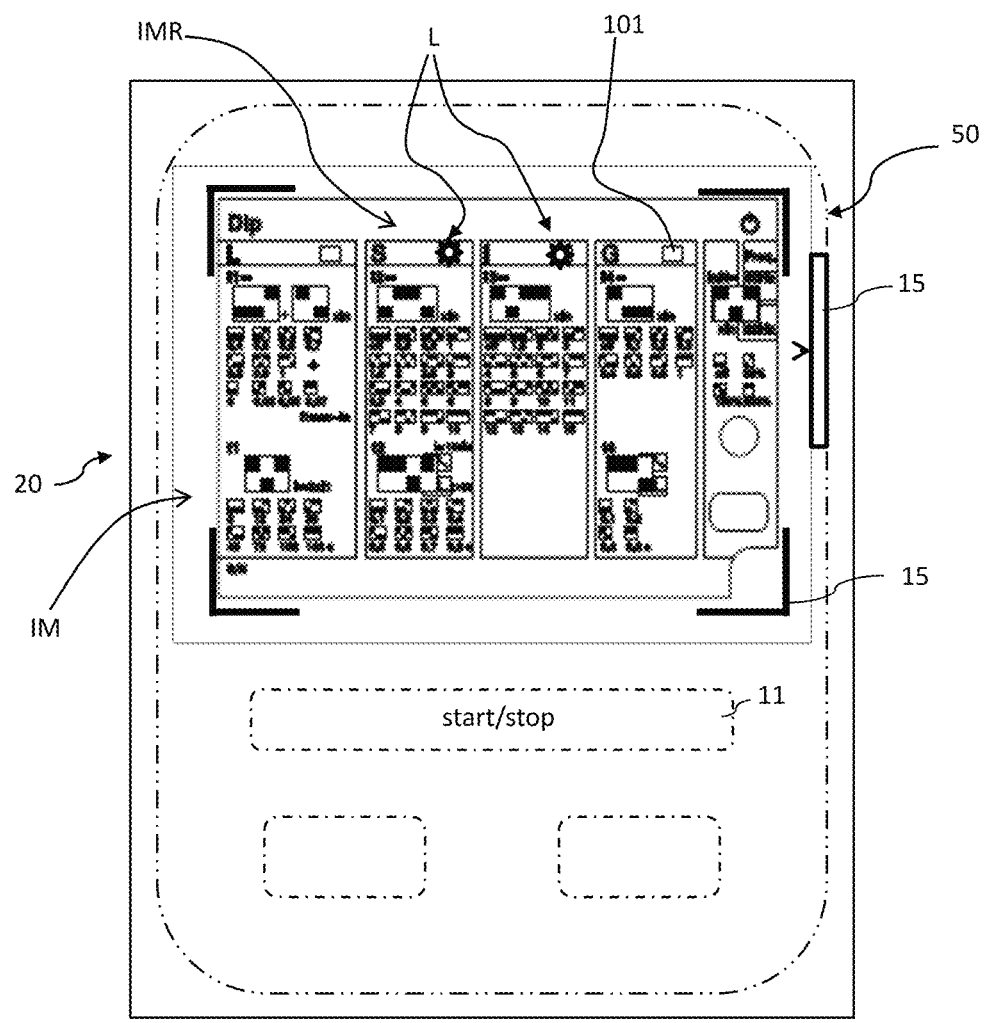

According to the disclosure, the method MTH includes a step, in which the control unit 10 select and sample image portions IMR of the images IM of the user-interface panel 110, which are captured by the camera 30 during an observation time interval, in which the user frames said user-interface panel by means of the mobile computerized device (FIG. 9).

In some embodiments, the control unit 10 carries out this sampling step upon receiving suitable input commands by the user, e.g. by activating suitable graphic patterns 11 made available by the GUI 50. In this way, for example, the user might easily control the duration of the above-mentioned observation time interval.

As an alternative, the control unit 10 may carry out this sampling step in an automatic manner upon the execution of the preceding steps illustrated above. In this case, the above-mentioned observation time interval might have a predefined duration.

Conveniently, the control unit 10 selects and sample the image portions IMR based on the identification information collected at the above-mentioned identification step of the user-interface components and physical features of the user-interface panel 110.

In particular, the control unit 10 will select and sample the image portions IMR in which user-interface components 101 capable of emitting light signals are present.

In some embodiments, the sampled image portions IMR are stored in a suitable memory, conveniently of volatile type.

According to the disclosure, the method MTH includes a step, in which the control unit 10 processes the sampled image portions to identify possible light signals L emitted by one or more user-interface components 101 of the user-interface panel 110.

In order to carry out this identification step, the control unit 10 detects the sequences of light pulses emitted by the user-interface components 101, e.g. by detecting the colour and the blinking frequency of said light pulses.

Subsequently, the control unit 10 compares the detected sequences of light pulses with predefined sequences of light pulses that can be emitted by the user-interface components of the electronic relay 100 (which have already been identified as described above).

The above-mentioned predefined sequences of light pulses are conveniently stored in a memory and they are retrieved by the control unit 10 based on the above-mentioned identification information collected at the above-mentioned identification step of the user-interface components and physical features of the user-interface panel 110.

In order to identify the light signals L emitted by the user-interface components, the control unit 10 may conveniently process the sampled images IMR captured by the camera 30 through data processing procedures or algorithms of known type, for example neural networks with Yolo algorithm, and the like.

In some embodiments, the control unit 10 carries out this identification step in real time, i.e. while the image portions IMR are sampled. In this way, when the above-mentioned observation period stops, the control unit 10 can immediately exploit the collected identification information of the emitted light signals L.

As an alternative, the control unit 10 may carry out the identification of the light signals L, at the end of the above-mentioned observation period.

According to the disclosure, the method MTH includes a step, in which the control unit 10, based on the above-mentioned identification information of the light signals L, shows first information I1 on the display 20, which describes the light signals L emitted by the user-interface components 101 during the above-mentioned observation period.

Figure 10:
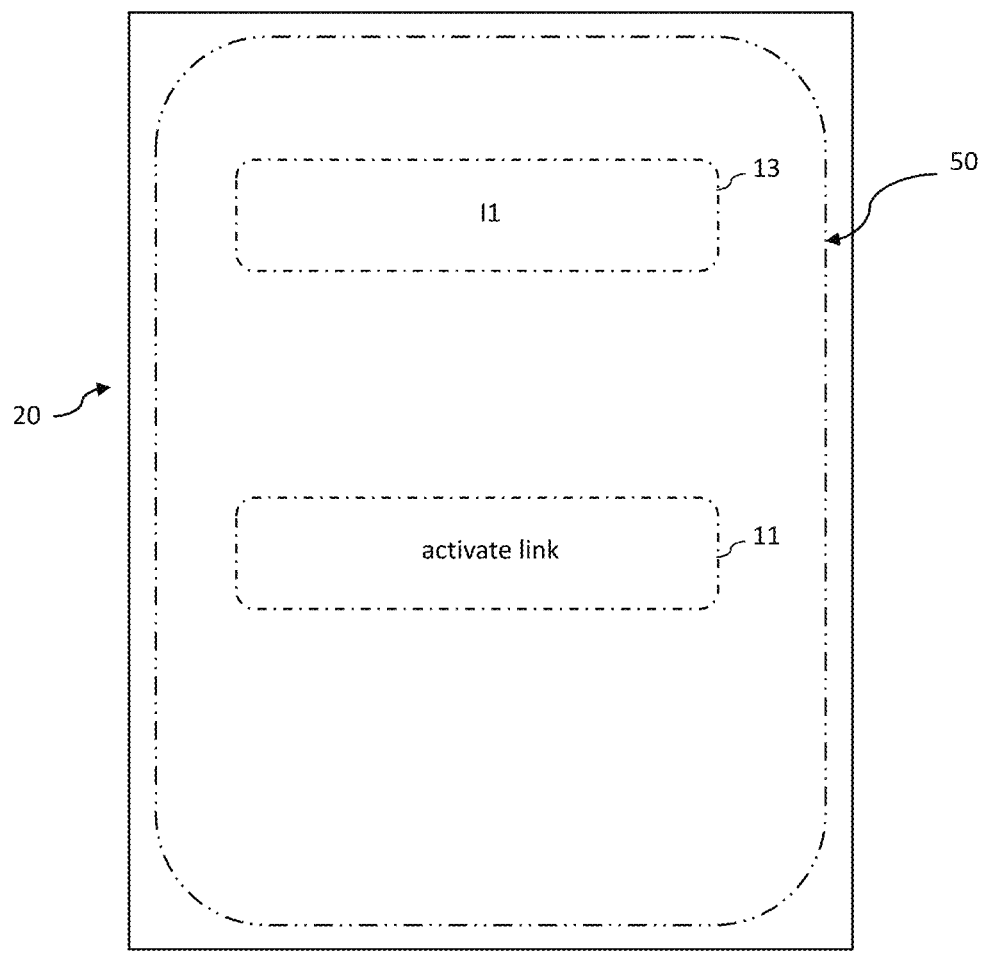

In some embodiments, the GUI 50 makes available a page showing a graphic pattern 13 (e.g. a graphic box) reporting identification information on the identified light signals L. In this way, the user can immediately understand the signalling content provided by the light signals L emitted by the electronic relay 100 (FIG. 10).

In some embodiments, the GUI 50 makes available also a graphic pattern 11, which can be activated by a user to access (e.g. through a HTLM link) to one or more text pages describing the identified light signals L in more details.

It is reiterated how the above-mentioned steps of identification of the light signals L emitted by the user-interface components of the user-interface panel 110 can be carried out independently on the physical nature of these signalling components.

The above-mentioned identification steps of the light signals L are particularly suitable for being carried out when the light signals L are emitted light sources 101 (e.g. LED devices) of the user-interface panel 110 (embodiment of FIG. 2 of the electronic relay).

However, these identification steps of the light signals L may be effectively carried out even if the light signals L are emitted by lighting icons or signs 102 shown on a display 114 of the user-interface panel 110 (embodiment of FIG. 3 of the electronic relay).

In some embodiments, the method MTH is designed to include some additional steps directed to improve the interaction of the user with the electronic relay 100 by using the mobile computerized device 1.

According to some embodiments of the disclosure, the method MTH of the disclosure includes a step, in which the control unit 10 shows second AR features 16 on the display 20 of the mobile computerized device (FIG. 5).

The second AR features 16 are configured to assist a user in identifying one or more user-interface components of the user-interface panel 110.

For example, the above-mentioned second augmented features 16 may be designed (e.g. in the form of arrows as shown in FIG. 5) to assist the user in finding the position of a given user-interface component of the user-interface panel 110, which is selected by the user.

As another example, the above-mentioned second augmented features 16 may be designed (e.g. in the form of text boxes) to provide the user with information related to a given user-interface component of the user-interface panel 110, which is selected by the user.

Conveniently, the control unit 10 shows the second AR features 16 superimposed to the images IM captured by the camera 30 and shown on the display 20. In this way, a user can easily identify a user-interface component of interest on the display 20 while framing the user-interface panel 110 of the electronic relay.

In some embodiments, the control unit 10 shows the above-mentioned second AR feature 16 in response to receiving suitable input commands by the user.

In some embodiments, the GUI 50 makes available a graphic menu or a similar graphic pattern 11 on the display 20 through which a user may select a user interface component of interest.

As an alternative, the GUI 50 may allow a user to select a given user-interface component of interest by directly touching this component on the image IM shown on the display 20.

The control unit 10 generates the second AR features 16 based on the identification information collected at the above-mentioned identification step of the user-interface components and physical features of the user-interface panel 110. The identification of the user-interface components of the user-interface panel 110 is, in fact, necessary to show correctly the second augmented features 16 on the display 20.

Figure 11:
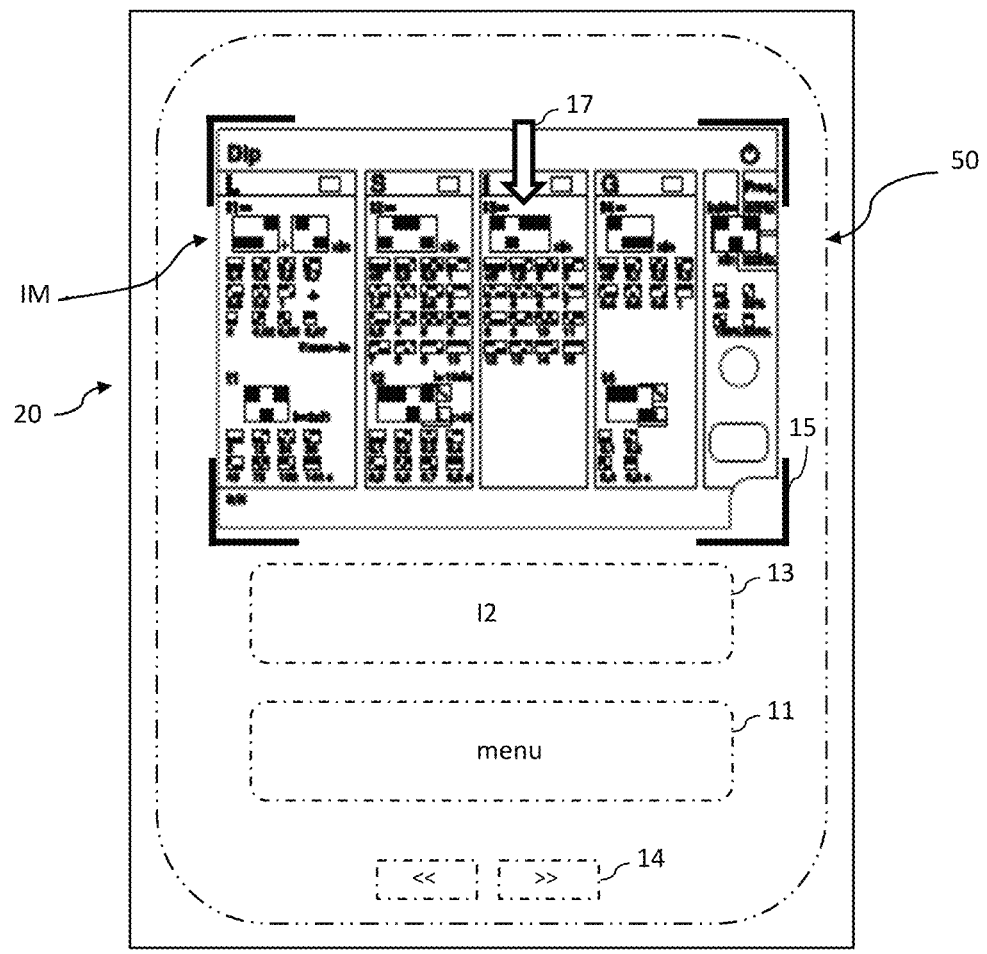

According to some embodiments of the disclosure, the method MTH of the disclosure includes a step, in which the control unit 10 shows third AR features 17 on the display 20 of the mobile computerized device (FIG. 11).

The third AR features 17 are configured to assist a user in carrying out an operating procedure (e.g. a test procedure) on the electronic relay 100.

Conveniently, the above-mentioned third AR features 17 are configured (e.g. in form of arrows) to indicate sequentially, on a selected image of the user-interface panel 110 shown on the display 20 of the mobile computerized device, the user-interface components to be operated in order to carry out the steps of above-mentioned test procedure.

In some embodiments, such an image of the user-predefined panel 110 is an image (fixed) captured by the control unit 10 (FIG. 11) and stored in a memory. In this way, in fact, a user is not obliged to frame the electronic relay 100 during the execution of the above-mentioned procedure.

In some embodiments, in addition to the above-mentioned third augmented reality features, the control unit 10 shows also second information I2 describing the operating steps of the operating procedure to be carried out by the user.

Conveniently, in addition to the image of the user-interface panel 110, the GUI 50 makes available suitable text boxes 13 sequentially reporting the above-mentioned information I2 for the steps of the operating procedure to be carried out (FIG. 11).

In addition to the above, in some embodiments, the GUI 50 makes available suitable navigation buttons 14 to allow the user to navigate sequentially between the steps of the operating procedure to be carried out (FIG. 11).

The above-mentioned steps of the method are particularly useful to improve the efficiency in operating the electronic relay 100.

At each step of the operating procedure to be carried out, the control unit 10 shows the third augmented features 17 and the text information I2 to assist the user in interacting with the electronic relay. The user may thus use the mobile computerized device 1 as a tutorial tool to carry out the operating procedure of interest.

In some embodiments, the control unit 10 carries out the above-illustrated steps of the method of the disclosure upon receiving suitable input commands by the user. A user may select an operating procedure of interest by activating a suitable graphic menu 11 made available by the GUI 50 on the display 20 (FIG. 11).

The method, according to the disclosure, provides relevant advantages with respect to the state of the art.

The method of the disclosure allows interacting easily and efficiently with an electronic relay in an assisted manner, through simple steps that can be carried out through a mobile computerized device 1 also by personnel having small experience or relatively low skills.

The method of the disclosure allows a user to distinguish one from another the light signals L emitted by the signalling components of the user-interface panel of an electronic relay and to understand correctly the signalling information provided by said light signals.

The method of the disclosure greatly facilitates the identification of the various user-interface components of the user-interface panel of an electronic relay as well as the execution of operating procedures (e.g. test procedures) to be carried out on the electronic relay.

Thanks to the use of a mobile computerized device, the method of the disclosure allows a user to interact easily with an electronic relay also in environments characterised by poor lighting conditions.

The method of the disclosure does not require powerful processing resources for being executed. It can thus be executed by mobile computerized devices commonly available on the market.

It is important to notice that the method of the disclosure can be carried out by a mobile computerized device in absence of Internet connectivity. This characteristic is particularly useful to facilitate the interaction with electronic relays installed in remote operating sites, in which the on-line consultation of technical manuals by the user would be quite difficult for obvious reasons.

The invention claimed is:

1. A method for assisting a user in interacting with an electronic relay for electric power distribution grids, said electronic relay having a user-interface panel including one or more user-interface components configured to allow the user to interact with said electronic relay, wherein said method comprises:
   activating a camera of a mobile computerized device;
   showing images of said user-interface panel on a display of said mobile computerized device, said images being captured by said camera while the user frames said user-interface panel using said mobile computerized device;
   processing said images to identify said user-interface components and physical features of said user-interface panel, the identification of said user-interface components and the physical features including a comparison of said images with predefined models of user-interface panels;
   based on the identification of said user-interface components and the physical features, showing first augmented reality features on said display, said first augmented reality features being configured to assist the user in framing said user-interface panel using said mobile computerized device, said first augmented reality features being shown superimposed to said images on said display;
   based on the identification of the user-interface components and the physical features of the user-interface panel, sampling one or more image portions of said user-interface panel captured during an observation time interval, in which the user frames said user-interface panel using said mobile computerized device;

processing the sampled image portions of said user-interface panel to identify one or more light signals emitted by one or more of said user-interface components of said user-interface panel, the identification of said light signals including a detection of sequences of light pulses emitted by said user-interface components and a comparison of the detected sequences of light pulses with predefined sequences of light pulses that can be emitted by said user-interface components; and based on the identification of said light signals, showing on said display, first information describing the identified light signals emitted by said user-interface components.

2. The method according to claim 1, wherein said light signals are configured to signal an electric fault or an operating status of said electronic relay or of an electric or electronic device operatively associated to said electronic relay.

3. The method according to claim 1, further comprising:
based on the identification of said user-interface components and the physical features, showing, on said display, second augmented reality features to assist the user in identifying said user-interface components, said second augmented reality features being superimposed to said images.

4. The method according to claim 1, further comprising:
showing, on said display, third augmented reality features to assist the user in carrying out an operating procedure on said electronic relay, said third augmented reality features being superimposed to a selected image of the user-interface panel of said electronic relay.

5. The method according to claim 4, further comprising:
showing, on said display, in addition to said third augmented reality features, second information describing operating steps of said operating procedure to be carried out by the user.

6. The method according to claim 1, further comprising:
providing a graphic user interface on said display, said graphic user interface including graphic resources to show graphic patterns configured to allow the user to interact with said mobile computerized device.

7. The method according to claim 1, wherein said electronic relay is installed on board a switching device for the electric power distribution grids.

8. The method according to claim 1, wherein said electronic relay is installed on an electric switchboard for the electric power distribution grids.

9. The method according to claim 1, wherein said electronic relay is a self-standing device installed in an electric power distribution grid.

10. A control unit of a mobile computerized device, said control unit operatively associated with a display and a camera, wherein said control unit comprises data processing resources capable of executing software instructions stored in a memory, said software instructions being configured to implement the method according to claim 1 when executed by said data processing resources.

11. A computer program stored in a memory, wherein the computer program comprises software instructions executable by data processing resources, said software instructions being configured to implement the method according to claim 1 when executed by said data processing resources.

* * * * *